Aug. 19, 1969       W. H. KLUSS       3,462,626

TORQUE TRANSFERRING ARRANGEMENT

Filed Dec. 30, 1966

William H. Kluss,
INVENTOR.

BY

ATTORNEY.

United States Patent Office 3,462,626
Patented Aug. 19, 1969

3,462,626
TORQUE TRANSFERRING ARRANGEMENT
William H. Kluss, Huntington Beach, Calif., assignor to Hughes Aircraft Company, Culver City, Calif., a corporation of Delaware
Filed Dec. 30, 1966, Ser. No. 606,361
Int. Cl. H02k 21/10, 23/60
U.S. Cl. 310—114      2 Claims

ABSTRACT OF THE DISCLOSURE

A cryogenic machine has a hermetically sealed casing having a housing segment containing the rotatably journalled machine power shaft. An inner permanent magnet assembly is keyed to the shaft for rotation therewith. An external housing is bearing mounted to the hermetically sealed housing segment for rotation thereabout. The external housing is provided with a magnet assembly operatively aligned with the first-mentioned internal magnet assembly. An annular coil winding is non-rotatably carried by housing segment and physically interposed between the respective magnet assembies. Interlocking magnetic fields provide a non-slip power driving connection between the inner rotatable shaft and the outer rotatable housing. The magnetic lines of force of the interlocking fields cut the interposed coil winding inducing an electric current therein. The coil is non-rotating and current may be conveniently tapped therefrom to provide a power source for an externally operating device. Slip rings are unnecessary and the concomitant noise generated thereby is avoided.

---

The invention relates to a torque transmission mode specifically adapted to a hermetically sealed machine that has, as an adjunct, concurrent production of electrical power during machine operation. The invention has particular utility in cryogenic equipment such as refrigerators or engines which utilize closed cycle operation.

In the field of cryogenic refrigerators and engines, it is well known that efficient long term operation is best provided by hermetically sealed equipment wherein the closed cycle working loop retains the refrigerating gas indefinitely. Such machines are preferably totally encased and a practically perfect seal with embient atmosphere is sought to be established. When a cryogenic machine is used as an engine an energy input is provided. Any external heat source such as an open flame, for example, may be effectively employed. However, a cryogenic engine of this type may not be self-starting. The machine's power output shaft is conventionally journalled to internal displacer and expansion pistons. This shaft must be independently rotated through a few cycles of operation before the energy input generates power and the machine will take over and continue machine operation. Maintaining a mechanical connection between the internal power shaft and an external mode of shaft rotation has been a problem in prior art machines because of the necessity of hermetically sealing the case. As noted above, the present invention provides magnetic interlock between a power shaft within the hermetically sealed case of the machine and an external rotatable housing. Further, an appropriate coil winding is positioned to create electric energy which may be used to operate an external device such as a fan. A fan, for example, may add to the efficiency of the machine by improving the ambient dissipation of machine heat.

Figure 1:
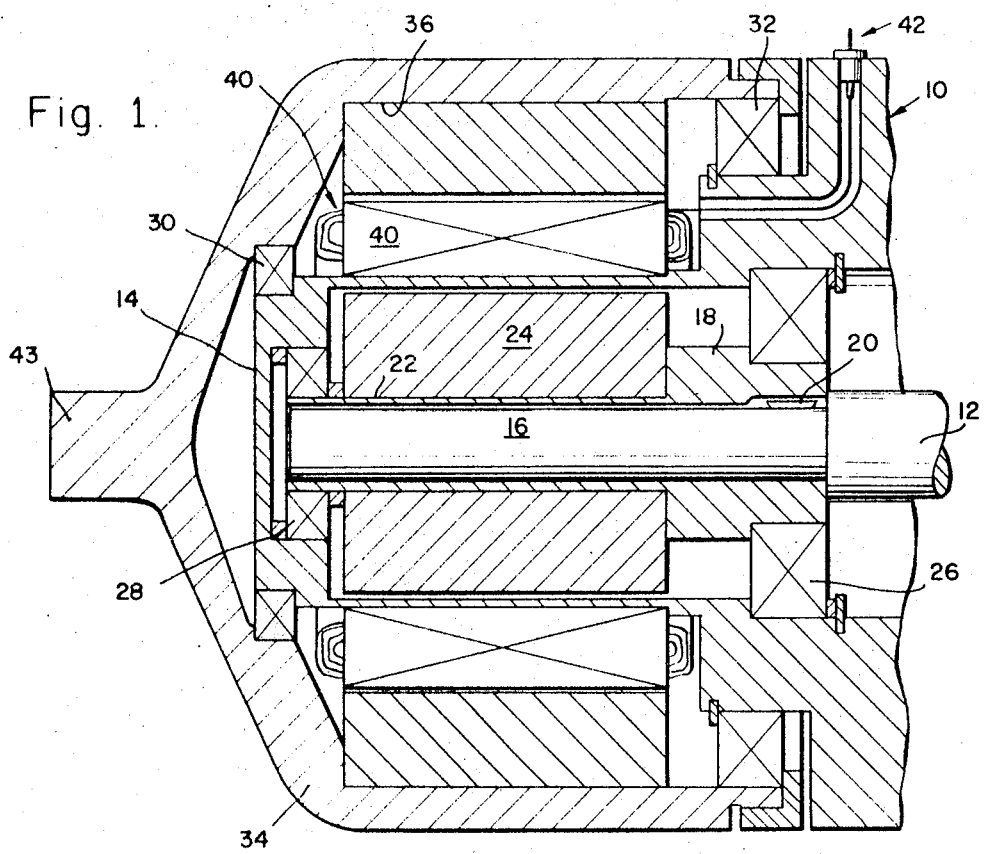
Figure 2:
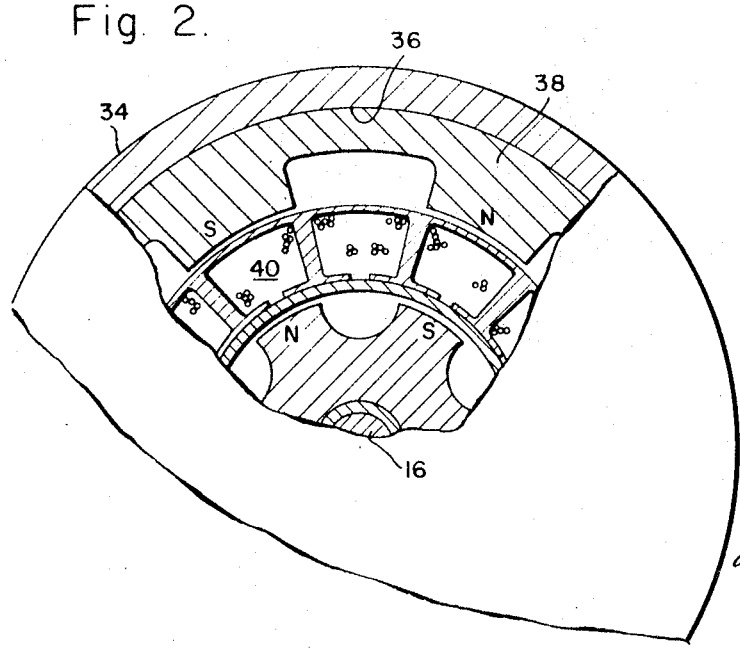

These and many other features and advantages of the invention will become apparent in the course of the following description and from an examination of the related drawings wherein:

FIGURE 1 is a partially fragmented central vertical sectional view of structure incorporating the invention; and FIG. 2 is an end elevational view taken from the left of FIG. 1 and partially fragmented to show internal construction features.

Describing the invention in detail, the numeral 10 generally indicates a hermetically sealed case which, in normal engine construction, may house compression and expansion chambers, associated pistons, connecting rods and journals (not shown) as well as a power shaft indicated generally at 12. The hermetically sealed case 10 may be provided with an integral segment 14 projecting from a side thereof and telescopically receiving therein a necked down segment 16 of the shaft 12. A collar 18 may be mounted on the portion 16 and keyed, as at 20, thereto. The collar 18 may be annularly formed as at 22 to mount a cylindrical magnet assembly 24. The magnet assembly 24 may be a conventional permanent magnet as will be familiar to those skilled in the art. At one end of the segment 16 a bearing 26 is provided which cooperates with concentric bearing 28 at the other end of the segment to provide a means for accommodating rotation of the shaft 12 within the housing segment 14. Magnet assembly 24 thereby is carried for rotation within the chamber defined by housing 14 and thus within the hermetically sealed environment of the case 10.

The housing segment 14 is provided with bearings 30 and 32 at opposed ends thereof which journally mount an external housing 34. The housing 34 may be annularly machined as at 36 to support a generally cylindrical element 38. The element 38 may be a permanent magnet assembly or may be a material such as soft iron which would be attracted by the magnetic field created by assembly 24. In the latter case it may be unitary with housing 34. The magnet assembly 38, of course, is positioned in radial alignment with the internal magnet assembly 34 and rotates around housing segment 14 with the external housing 34. As a result of the location of magnetic assemblies 24 and 38, a non-slip force coupling is created such that rotation of the shaft 16 will induce concurrent rotation of external housing 34, and, alternately, rotation of the housing 34 will induce concurrent rotation of the shaft 16. Of course, the north-south poles of assemblies 24 and 38 are aligned as shown in FIG. 2.

As noted above, cryogenic devices which operate in an engine mode and utilize as power an external heat source may not be self-starting. In order to begin engine operation, it is necessary that the power output shaft be rotated by some external source to induce a few cycles of operation, thus creating the thermodynamic condition necessary within the equipment to begin operating in the engine mode. With the invention as descibed and applied to such cryogenic engine, it will be apparent that an operator may induce this few cycle operation by manually rotating the housing 34 and thus creating motion which will provide the starting mode for the engine. Thereafter, independent engine operation will induce rotation of shaft 16 and the housing 34 will rotate therewith as described.

As an additional feature of the invention, it is proposed that a coil winding, indicated generally at 40, be provided and interposed between the inner and outer magnet assemblies 24 and 38. The winding, in this position, will be fixedly mounted to housing segment 14 and, therefore, not be influenced by the physical motion of the housing 34 or shaft 16. As a result of such motion, the magnetic field existent between the assemblies 24 and 38 will sequentially and progressively cut the windings of coil 40 and induce an electrical current therein which current may be withdrawn by leads 42 through case 10 and used to power some external device. Of course, the leads 42 do not break the hermetic seal of the case 10. For example, a fan may be employed to increase the convective heat dissipated from the cryogenic engine and thereby improve its efficient operation. For example, a fan may be mounted on shaft extension 43 projecting from external housing 34. Of course, other mechanical devices may be operated directly from housing 34. An additional feature of this structure is that it is not necessary to employ slip rings to tap the electrical current, and, accordingly, a conventional commutator is not required. Undesirable electrical noise associated with commutator operation is eliminated.

It will thus be seen that the invention as described provides a convenient and effective mode of power transfer between an external rotatable element and an internal rotatable element on a cryogenic machine. The power transfer is effected even though the machine is hermetically sealed. The arrangement facilitates engine start-up when the machine is used in an engine mode and provides a means of obtaining external mechanical power output as a result of internal machine work without having structure which could impair the integrity of the hermetically sealed case. Additionally, the arrangement provides a mode of obtaining at least part of the work output of the machine in an electric current mode which may then be utilized as a power source to operate other devices.

The arrangement is by way of illustration and not limitation and may be subject to certain modifications all within the scope of the appended claims.

What is claimed is:

1. In a torque transferring arrangement for hermetically sealed machines,
   a housing segment forming a portion of the hermetically sealed machine,
   a shaft positioned within the housing segment and journalled for rotation therein,
   an internal magnet assembly within the housing segment and keyed to the shaft for rotation therewith,
   an external housing journally mounted to the housing segment for rotation thereabout,
   an external magnet assembly affixed to the outer housing for rotation therewith and operatively aligned with the internal magnet assembly,
   said magnet assemblies creating interlocking magnetic fields whereby the rotation of one magnet assembly induces concurrent rotation of the other magnet assembly and its related structure,
   and a coil winding carried by the housing segment and interposed between the magnetic assemblies whereby rotation of the latter induces an electric current to flow within the windings.

2. A torque transferring arrangement for a hermetically sealed machine according to claim 1,
   wherein said coil winding is fixedly carried by the housing segment and non-rotatable relative thereto,
   and direct wire leads electrically connected to the winding and extending externally of the hermetically sealed housing segment.

References Cited

UNITED STATES PATENTS

| | | | |
|---|---|---|---|
| 2,753,475 | 7/1956 | Curl | 310—114 |
| 2,941,137 | 6/1960 | Fehn | 310—67 |

WARREN E. RAY, Primary Examiner

R. SKUDY, Assistant Examiner

U.S. Cl. X.R.

310—52, 67, 71, 156, 266